US009925628B2

(12) United States Patent
Drexler

(10) Patent No.: US 9,925,628 B2
(45) Date of Patent: Mar. 27, 2018

(54) METHOD FOR INSTALLING FASTENERS WITH ELECTROMAGNETIC EFFECT PROTECTION

(71) Applicant: The Boeing Company, Chicago, IL (US)

(72) Inventor: Julie M. Drexler, Brier, WA (US)

(73) Assignee: THE BOEING COMPANY, Chicago, IL (US)

( * ) Notice: Subject to any disclaimer, the term of this patent is extended or adjusted under 35 U.S.C. 154(b) by 852 days.

(21) Appl. No.: 14/206,145

(22) Filed: Mar. 12, 2014

(65) Prior Publication Data

US 2015/0258646 A1 Sep. 17, 2015

(51) Int. Cl.
*B21J 15/38* (2006.01)
*B23P 19/02* (2006.01)
*B21J 15/02* (2006.01)
*B21J 15/08* (2006.01)
*B21J 15/14* (2006.01)
*B21J 15/30* (2006.01)
*F16B 33/00* (2006.01)

(52) U.S. Cl.
CPC ............ *B23P 19/02* (2013.01); *B21J 15/02* (2013.01); *B21J 15/08* (2013.01); *B21J 15/142* (2013.01); *B21J 15/147* (2013.01); *B21J 15/30* (2013.01); *B21J 15/38* (2013.01); *F16B 33/004* (2013.01); *Y10T 29/49945* (2015.01); *Y10T 29/53909* (2015.01)

(58) Field of Classification Search
CPC .. B23P 19/02; B21J 15/30; B21J 15/38; B21J 15/02; B21J 15/08; B21J 15/147; B21J 15/142; Y10T 29/49945; Y10T 29/53909; F16B 33/004
See application file for complete search history.

(56) References Cited

U.S. PATENT DOCUMENTS 3,960,206 A * 6/1976 Baxter ............... B21J 15/30
165/47
4,630,168 A 12/1986 Hunt
5,614,037 A * 3/1997 Keener ............... B05D 3/0254
148/537

(Continued)

FOREIGN PATENT DOCUMENTS

CN 1451783 A 10/2003
SU 670370 A1 6/1979

OTHER PUBLICATIONS

Canadian Intellectual Property Office Examination Search Report, dated Nov. 26, 2015, regarding Application No. 2,869,658, 4 pages.

(Continued)

*Primary Examiner* — Sarang Afzali
*Assistant Examiner* — Ruth G Hidalgo-Hernandez
(74) *Attorney, Agent, or Firm* — Yee & Associates, P.C.

(57) ABSTRACT

A method for installing a fastener by positioning a cap around the fastener, spraying a cooling agent from a sprayer of a cooling system. The fastener may have a top portion including a dielectric material. The cooling system may be configured to cool the top portion of the fastener to stiffen the top portion. A tool may be configured to install the fastener in a structure after cooling, while retaining the cooling agent within the cap.

13 Claims, 14 Drawing Sheets

(56) References Cited

U.S. PATENT DOCUMENTS

2004/0140026 A1* 7/2004 Kamat ................... C22F 1/047
                                                    148/698
2013/0018507 A1* 1/2013 Haag ....................... B25J 9/161
                                                    700/245
2013/0259604 A1 10/2013 Whitlock et al.

OTHER PUBLICATIONS

Extended European Search Report, dated Jul. 31, 2015, regarding Application No. EP15157815.0, 6 pages.

* cited by examiner

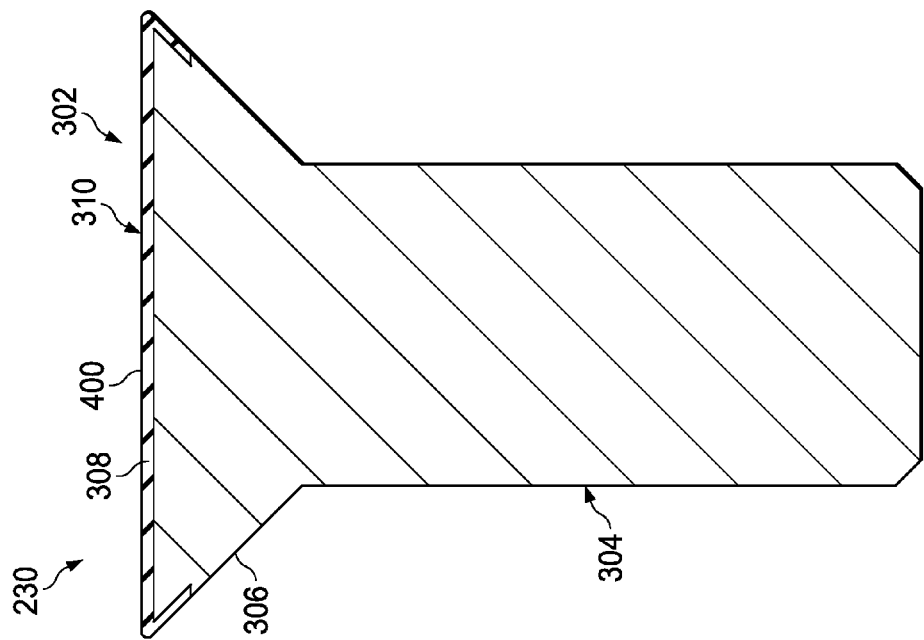
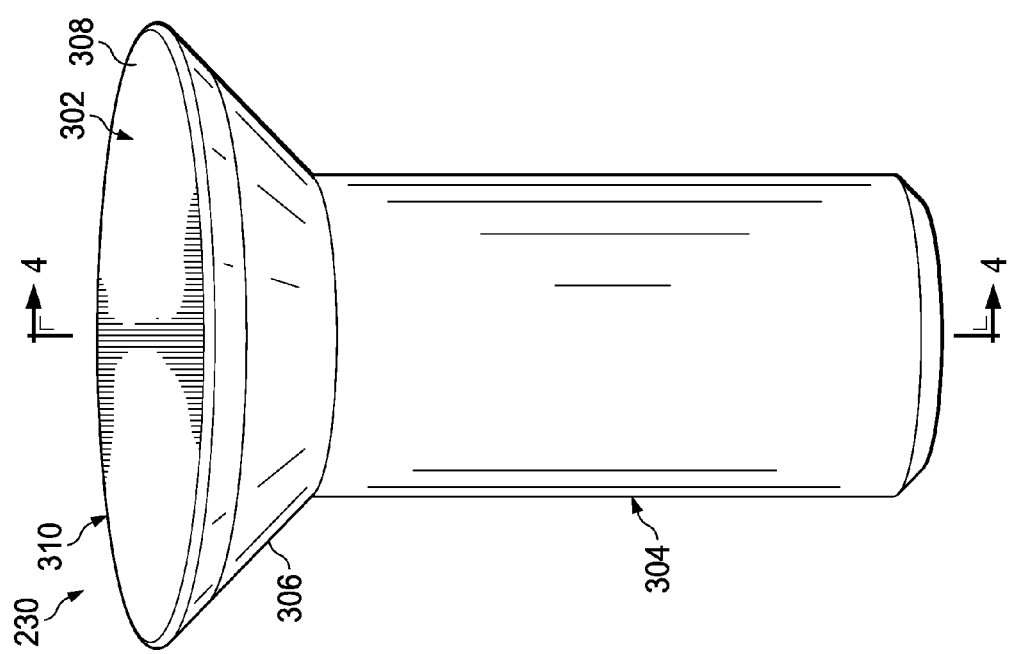
FIG. 4
FIG. 3

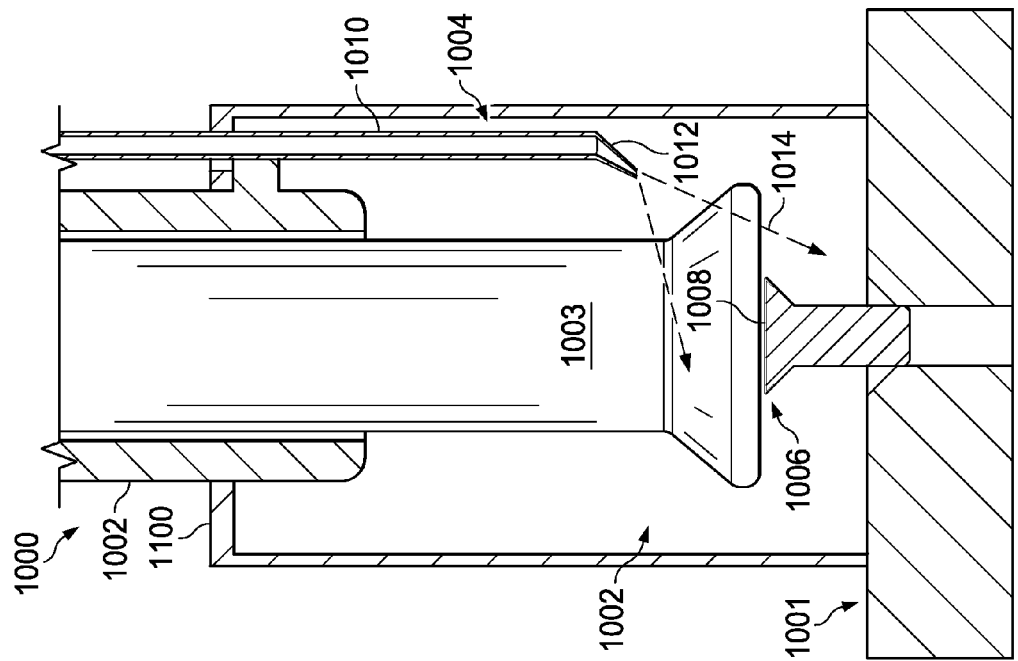
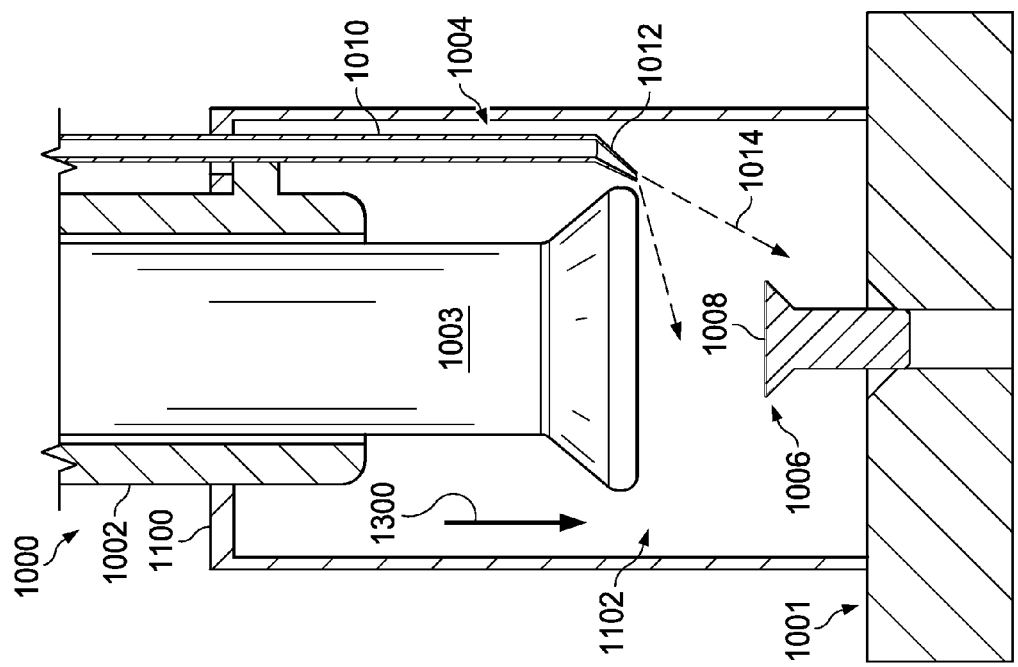

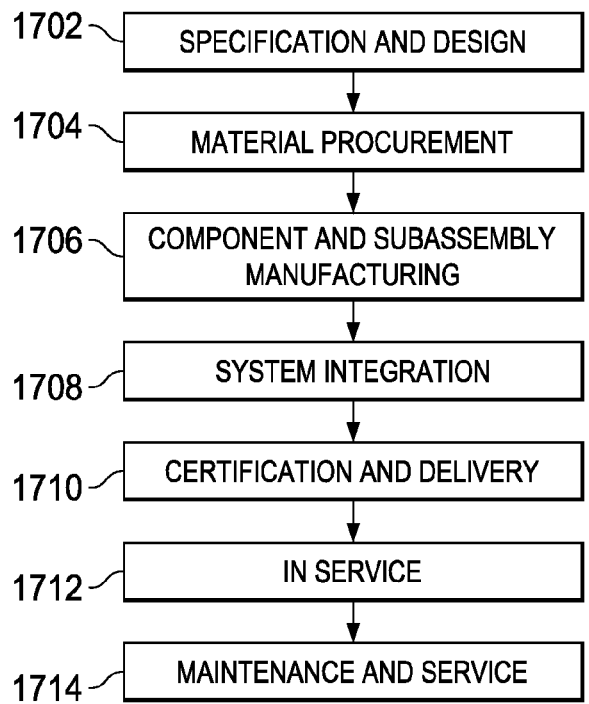
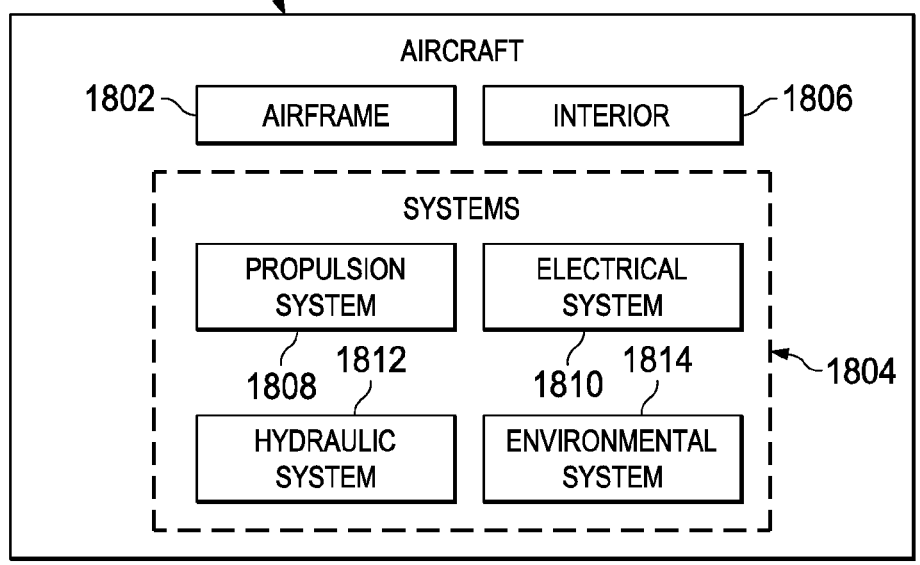

METHOD FOR INSTALLING FASTENERS WITH ELECTROMAGNETIC EFFECT PROTECTION

CROSS-REFERENCE TO RELATED APPLICATION

This application is related to the following U.S. patent application Ser. No. 13/434,835, filed Mar. 29, 2012, and entitled "Fastener Systems that Provide EME Protection," which is incorporated herein by reference in its entirety.

BACKGROUND INFORMATION

1. Field

The present disclosure relates generally to aircraft and, in particular, to manufacturing aircraft. Still more particularly, the present disclosure relates to a method and system for installing fasteners with electromagnetic effect protection in an aircraft.

2. Background

In manufacturing aircraft, different parts may be connected to each other to form aircraft structures. Aircraft structures may include, for example, without limitation, a wing and a fuselage of an aircraft. In some cases, these aircraft structures are formed from composite materials.

A number of fasteners may be used to assemble composite structures, attach composite structures to the aircraft, or both. Typically, these fasteners may include a head and a metal shank. The head may have a top portion comprising at least one of a metal, a soft polymeric material, or some other suitable type of material. Thousands of fasteners may be used in forming the aircraft.

An aircraft formed from composite structures may be exposed to various types of conditions during operation. Some of these conditions may result in undesirable electromagnetic effects.

Composite structures in the aircraft may not conduct the electrical currents and electromagnetic forces generated by these conditions away from the structures in a desired manner. In other illustrative examples, these electromagnetic effects may have an undesirable effect on composite structures, systems within the aircraft, or a combination thereof.

To protect against electromagnetic effects, aircraft may be equipped with electromagnetic effect protection. Electromagnetic effect protection may be used to divert current in a desired manner. For example, without limitation, a conductive coating may be placed on the surface of a composite structure to divert current from a lightning strike away from metal fasteners used to join the composite structures. In other illustrative examples, a dielectric sealant may be used between components to reduce arcing and sparking.

In some instances, a dielectric coating may be associated with the head of the fastener to protect against electromagnetic effects. In an illustrative example, a cap formed from dielectric material may be placed on the head of the fastener. In another illustrative example, the outermost portion of the head of the fastener is formed from a dielectric coating. This dielectric coating may be formed from, for example, without limitation, a soft polymeric material.

Fasteners including electromagnetic event protection may be installed in various ways. For example, without limitation, at least one of human operators, human-controlled machines, or computer-controlled machines may install the fasteners using an installation device. The fasteners may be installed such that a substantially smooth surface is formed at the interface between the composite structure and the fastener. For instance, the fasteners may be countersunk into the surface of the composite structure. This substantially smooth surface may increase the aerodynamic performance of the aircraft.

In some cases, however, installing fasteners with electromagnetic effect protection may result in undesired inconsistencies forming on the top portion of the fastener. In this illustrative example, the top portion of a fastener may include the dielectric cap, dielectric coating, or both, associated with the head of the fastener. These inconsistencies may include, for example, without limitation, protrusions, cracks, voids, deformation, and other types of inconsistencies. These inconsistencies may reduce the effectiveness of the fastener at diverting electromagnetic effects, decreasing the aerodynamic performance of the composite structures, or both. Accordingly, there is a need for a method and system which take into account one or more of the issues discussed above as well as possibly other issues.

SUMMARY

In one illustrative embodiment, a method for installing a fastener is presented. A top portion of the fastener may be stiffened. The fastener may be installed in a structure.

In another illustrative embodiment, a fastener installation system may comprise a fastener, a cooling system, and a tool. The fastener may have a top portion including a dielectric material. The cooling system may be configured to cool the top portion of the fastener to stiffen the top portion. The tool may be configured to install the fastener in a structure after cooling.

In yet another illustrative embodiment, a method for installing a fastener is presented. The fastener may be positioned within a cooling system associated with a robotic device. The cooling system may be configured to cool the fastener prior to installing the fastener using the robotic device. The fastener may be selected from one of a bolt, a screw, a hexdrive, an interference fit fastener, a rivet, a lockbolt, and a tapered sleeved bolt. A top portion of the fastener may be cooled using at least one of dry ice, liquid nitrogen, a refrigerant, a cooler, a refrigeration unit, or cooled air to stiffen the top portion. The top portion of the fastener may include a dielectric material selected from at least one of a polymer, a thermoplastic material, a thermoset material, an adhesive, or rubber. The dielectric material may be configured to provide electromagnetic effect protection. The fastener may be cooled to a temperature such that the top portion of the fastener may have a desired level of stiffness. The fastener may be installed in a structure using a rivet gun associated with the robotic device after cooling such that deformation in the top portion of the fastener may be reduced when installed in the structure in an aircraft.

In still another illustrative embodiment, a fastener installation system may comprise a fastener having a top portion including a dielectric material. The dielectric material may be configured to provide electromagnetic effect protection. The dielectric material may form a dielectric cap configured to seal a head of the fastener from penetration of electric charges. The fastener may be selected from one of a bolt, a screw, a hexdrive, an interference fit fastener, a rivet, a lockbolt, and a tapered sleeved bolt. The dielectric material may be selected from at least one of a polymer, a thermoplastic material, a thermoset material, an adhesive, or rubber. A cooling system may be associated with a rivet gun and configured to cool the top portion of the fastener to stiffen the top portion. The cooling system may cool the fastener to a temperature such that the top portion of the fastener may have a desired level of stiffness. The cooling system may be associated with a robotic device and may be configured to cool the fastener prior to installing the fastener using the robotic device. The cooling system may comprise at least one of dry ice, liquid nitrogen, a refrigerant, a cooler, a refrigeration unit, or cooled air. A tool may comprise the rivet gun and may be configured to install the fastener in a structure after cooling such that deformation in the top portion of the fastener may be reduced. The rivet gun may be an end effector of the robotic device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a fastener with electromagnetic effect protection in accordance with an illustrative embodiment;

FIG. 4 is an illustration of a cross-sectional view of a fastener with electromagnetic effect protection in accordance with an illustrative embodiment;

FIG. 13 is an illustration of a cross-sectional view of a rivet gun with a cooling system in accordance with an illustrative embodiment;

FIG. 14 is an illustration of a cross-sectional view of a rivet gun with a cooling system in accordance with an illustrative embodiment;

FIG. 17 is an illustration of an aircraft manufacturing and service method in the form of a block diagram in accordance with an illustrative embodiment; and FIG. 18 is an illustration of an aircraft in the form of a block diagram in which an illustrative embodiment may be implemented.

DETAILED DESCRIPTION

The illustrative embodiments recognize and take into account one or more different considerations. For example, without limitation, the illustrative embodiments recognize and take into account that it may be desirable to reduce or eliminate deformation in the dielectric material associated with the fastener head that may occur when a fastener with electromagnetic effect protection is installed in a composite structure. As an example, the illustrative embodiments recognize and take into account that the dielectric material used to provide electromagnetic effect protection may be softer or more prone to deformation than desired. As a result, some currently used methods for installing fasteners with electromagnetic event protection may cause deformation in the material.

The illustrative embodiments recognize and take into account that this deformation may be undesirable for various reasons. For instance, deformation of the top portion of the fastener may cause an uneven surface on the composite structure. In particular, the top portion of the fastener may not lie within desired tolerances with respect to the surface of the composite structure. This uneven surface may reduce the aerodynamic performance of the composite structure. Additionally, the illustrative embodiments recognize and take into account that deformation in the material that results in uneven surfaces on the aircraft may not meet certification requirements for the aircraft. As a result, the composite structures for the aircraft may need to be reworked or discarded.

Thus, the illustrative embodiments provide a method and system for installing a fastener with electromagnetic effect protection. In an illustrative example, a top portion of the fastener may be cooled to stiffen the top portion. The top portion of the fastener may include a dielectric material. The dielectric material may be mechanically connected to the fastener head or formed as part of the fastener head. In some cases, an adhesive is used to secure the dielectric material to the fastener head. The fastener may then be installed in a structure after cooling such that deformation in the top portion of the fastener may be reduced or eliminated when installed in the structure. Specifically, plastic deformation in the dielectric material on the top portion of the fastener may be reduced or eliminated.

Figure 1:
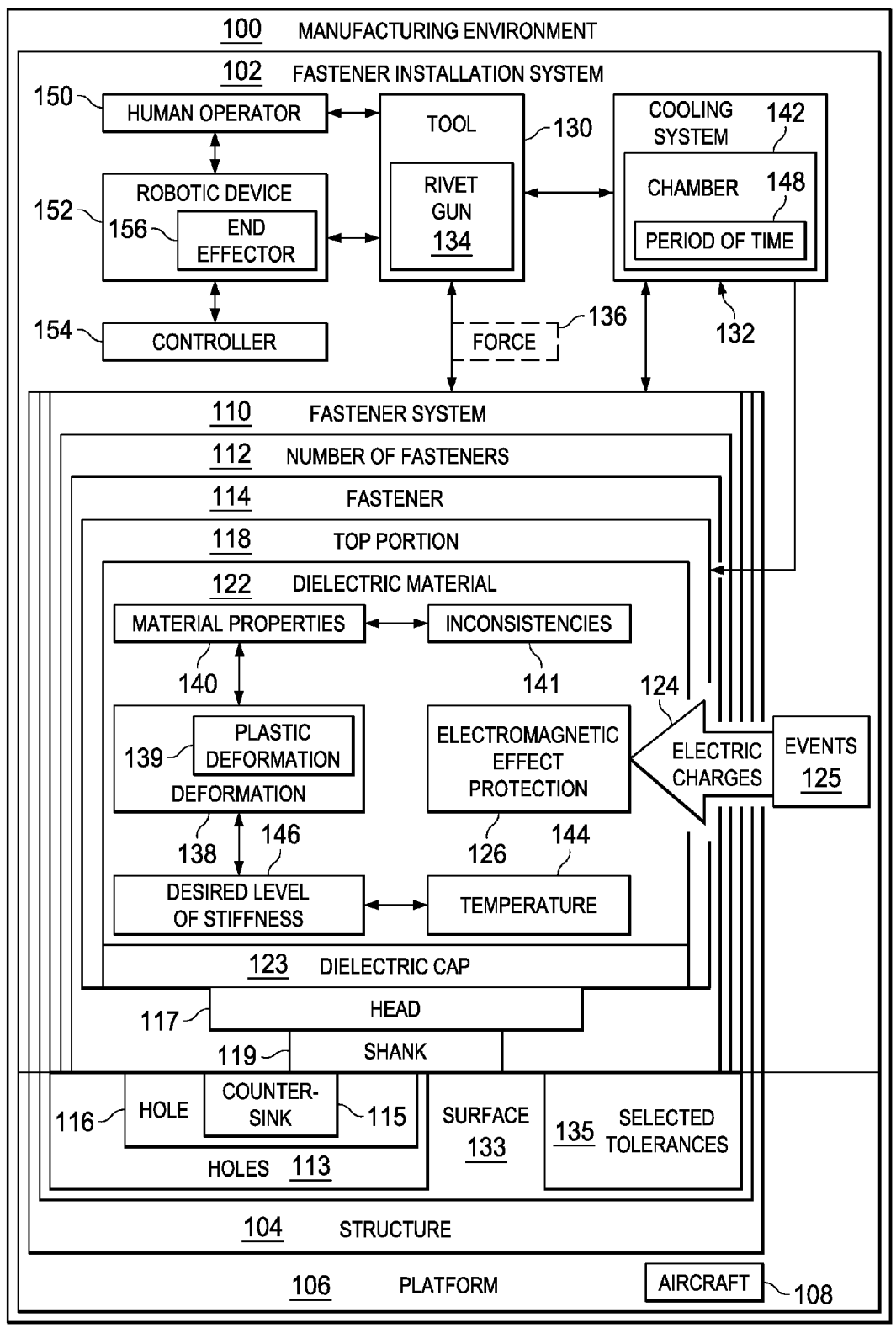
FIG. 1 is an illustration of a block diagram of a manufacturing environment in accordance with an illustrative embodiment.

Referring now to the figures and, in particular, with reference to FIG. 1, an illustration of a block diagram of a manufacturing environment is depicted in accordance with an illustrative embodiment. Manufacturing environment 100 may be an example of one environment in which fastener installation system 102 may be used to assemble structure 104.

In the illustrative example, structure 104 may take a number of different forms. For example, without limitation, structure 104 may be selected from one of a wing box, a spar assembly, a skin panel, a fuselage section, a structural frame, an engine housing, and other suitable types of structures. Structure 104 may comprise a material selected from one of metal, a metal alloy, composite material, some other suitable type of material, and a combination thereof in this illustrative example.

As depicted, structure 104 may be physically associated with platform 106. When one component is "physically associated" with another component, the association may be a physical association in the depicted examples. For example, without limitation, a first component, structure 104, may be considered to be physically associated with a second component, platform 106, by being secured to the second component, bonded to the second component, mounted to the second component, welded to the second component, fastened to the second component, and/or connected to the second component in some other suitable manner. The first component also may be connected to the second component using a third component. The first component may also be considered to be physically associated with the second component by being formed as part of the second component, an extension of the second component, or both. Platform 106 may be aircraft 108 in the illustrative example.

As illustrated, fastener installation system 102 may be used to install fastener system 110 in structure 104. Fastener system 110 may include number of fasteners 112. As used herein, a "number of" items may include one or more items. In this manner, number of fasteners 112 may include one or more fasteners.

Number of fasteners 112 may be configured to be installed in holes 113 in structure 104. One or more of number of fasteners 112 may be associated with, for example, without limitation, one or more washers, spacers, or other suitable components.

Holes 113 may be formed prior to or during installation of number of fasteners 112. Holes 113 may include countersinks in this illustrative example. Hole 116 with countersink 115 may be one of holes 113.

Number of fasteners 112 may include fastener 114 in this illustrative example. Fastener 114 may have head 117 and shank 119. Head 117 may be larger than shank 119 of fastener 114. Head 117 may be shaped to prevent fastener 114 from being driven deeper into structure 104 than desired. Shank 119 may be the cylindrical length of fastener 114 that extends from the end of head 117.

Head 117 may be received by countersink 115 in hole 116. Shank 119 may be received by a cylindrical portion of hole 116 in this illustrative example.

Fastener 114 may be selected from one of a bolt, a screw, a hexdrive, an interference fit fastener, a rivet, a lockbolt, a tapered sleeved bolt, and other suitable types of fasteners. In this illustrative example, an "interference fit" fastener may have a shank with a diameter that is greater than the diameter of the cylindrical portion of the hole in which it is installed. As an example, shank 119 of fastener 114 may have a diameter that is greater than a diameter of the cylindrical portion of hole 116 extending through structure 104 from the end of countersink 115.

In this depicted example, fastener 114 may have top portion 118. Top portion 118 of fastener 114 may include dielectric material 122. Dielectric material 122 may be associated with head 117 of fastener 114. Dielectric material 122 may extend beyond the perimeter of head 117 in some illustrative examples. Dielectric material 122 may not extend beyond the perimeter of holes 113 in this illustrative example. Top portion 118 of fastener 114 also may include other materials, structures, or both that may be associated with head 117.

As depicted, dielectric material 122 may take the form of a coating, a cap, a layer, or some other structure physically associated with head 117 of fastener 114. In an illustrative example, dielectric material 122 may form dielectric cap 123. Dielectric cap 123 may fit over a portion of head 117 of fastener 114.

In some cases, dielectric material 122 may be formed as part of head 117. In other cases, dielectric material 122 may be placed over head 117 after fastener 114 is formed. For instance, dielectric material 122 may be deposited on head 117 of fastener 114 using a number of different processes.

As an illustrative example, dielectric material 122 may be deposited on head 117 of fastener 114 using powder coating, injection molding, painting, plating, spraying, sputtering, or other suitable processes. In another illustrative example, dielectric material 122 may be wrapped around head 117 of fastener 114. In one example, dielectric cap 123 may be placed over head 117 of fastener 114 after fastener 114 is formed but before fastener 114 is installed in structure 104.

Dielectric material 122 may be an electrical insulator in this illustrative example. Dielectric material 122 may be used to prevent electric charges 124 from flowing through dielectric material 122 and reaching head 117 of fastener 114.

Electric charges 124 may be a result of events 125. Events 125 may include, for example, without limitation, a lightning strike, equipment failure, static electricity, and other types of events. When fastener 114 with dielectric material 122 encounters electric charges 124, dielectric material 122 may substantially prevent electric charges 124 from reaching shank 119 of fastener 114, structure 104, or both. For instance, dielectric cap 123 may be configured to seal head 117 of fastener 114 from penetration of electric charges 124. In this manner, dielectric material 122, such as dielectric cap 123, may be configured to provide electromagnetic effect protection 126 for fastener 114 and structure 104.

In this illustrative example, dielectric material 122 may comprise a number of different types of materials. For example, without limitation, dielectric material 122 may be selected from at least one of a polymer, a thermoplastic material, a thermoset material, an adhesive, rubber, or some other suitable type of material.

As used herein, the phrase "at least one of," when used with a list of items, may mean different combinations of one or more of the listed items may be used and only one of each item in the list may be needed. The item may be a particular object, thing, or category. In other words, "at least one of" may mean any combination of items and number of items may be used from the list, but not all of the items in the list may be required.

For example, without limitation, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this depicted example, fastener installation system 102 may be used to install fastener 114 with dielectric material 122. Fastener installation system 102 may include tool 130 and cooling system 132 in this illustrative example.

Tool 130 may be a device configured to install fastener 114 in structure 104. For example, without limitation, tool 130 may be a device used to drive fastener 114 into structure 104. Tool 130 may be used to install fastener 114 in structure 104 such that top portion 118 of fastener 114 with dielectric material 122 lies within selected tolerances 135 of surface 133 of structure 104.

In this illustrative example, selected tolerances 135 may describe whether top portion 118 of fastener 114 lies substantially flush with surface 133 of structure 104, proud of surface 133 of structure 104, recessed from surface 133 of structure 104, and other configurations. When top portion 118 of fastener 114 lies within selected tolerances 135 of surface 133 of structure 104, aerodynamic performance of structure 104 may be increased when aircraft 108 is in operation. Selected tolerances 135 may be based on at least one of certification requirements, industry standards, internal company requirements, or a combination thereof.

Tool 130 may take various forms in this illustrative example. For example, without limitation, tool 130 may take the form of a hammer, a press, a riveting device, some other suitable type of tool, or a combination thereof. In this illustrative example, tool 130 may comprise rivet gun 134. Rivet gun 134 may be a device used to drive fastener 114 into structure 104. Rivet gun 134 may be selected from a hydraulic rivet gun, a pneumatic rivet gun, and other suitable types of rivet guns.

In this illustrative example, tool 130 may drive fastener 114 into hole 116 in surface 133 of structure 104 by exerting force 136 on top portion 118 of fastener 114. In some cases, because dielectric material 122 in top portion 118 of fastener 114 may be softer than desired, force 136 from tool 130 may cause deformation 138, inconsistencies 141, or both in top portion 118 with dielectric material 122.

Deformation 138 may take a number of different forms in this illustrative example. Deformation 138 may take the form of plastic deformation 139 in this illustrative example. In other illustrative examples, deformation 138 may take the form of at least one of cracks, voids, protrusions, or other suitable types of deformation.

Plastic deformation 139 caused by force 136 may be permanent in this illustrative example. In other words, once deformation 138 of dielectric material 122 in top portion 118 of fastener 114 reaches a point above the yield stress of dielectric material 122, plastic deformation 139 will occur and top portion 118 may not return to its original shape. In other words, once plastic deformation 139 occurs in dielectric material 122 in top portion 118 of fastener 114, fastener 114 may need to be reworked, removed, or discarded.

In this depicted example, inconsistencies 141 in dielectric material 122 in top portion 118 of fastener 114 also may occur when force 136 is used to install fastener 114. Inconsistencies 141 may take the form of at least one of cracks, delamination, fracture, or other inconsistencies in dielectric material 122.

Inconsistencies 141 are undesired inconsistencies in this illustrative example. Undesired inconsistencies may be those inconsistencies that lie outside of selected tolerances. In a similar fashion, deformation 138 is undesired deformation. Undesired deformation may be deformation outside of selected tolerances. Tolerances for deformation, inconsistencies, or both may be selected based on at least one of certification requirements, internal airline standards, or other suitable standards.

Inconsistencies 141 may result in decreased electromagnetic effect protection 126, as well as other undesirable conditions, for fastener 114. In this illustrative example, plastic deformation 139, inconsistencies 141, or both may occur in dielectric material 122 in top portion 118 due to material properties 140 of dielectric material 122. For instance, dielectric material 122 may be a soft polymeric material. In this case, dielectric material 122 may not be able to withstand force 136 without returning to its original shape or without experiencing various types of inconsistencies.

Force 136, however, may be needed to properly drive fastener 114 into structure 104. For example, without limitation, because shank 119 of fastener 114 has a diameter that is greater than the cylindrical portion of hole 116, force 136 may be needed to properly interference fit fastener 114. As a result, and in order to properly secure fastener 114 into structure 104, plastic deformation 139, inconsistencies 141, or both may occur in dielectric material 122 in top portion 118 of fastener 114. Plastic deformation 139 and inconsistencies 141 may be undesirable because the aerodynamic performance of structure 104, the effectiveness of dielectric material 122 for electromagnetic effect protection 126, or a combination thereof may be reduced more than desired.

In this illustrative example, cooling system 132 may be used to reduce deformation 138 in top portion 118 of fastener 114 to a desired level. As an example, cooling system 132 may be used to reduce plastic deformation 139 from occurring in dielectric material 122 in top portion 118 of fastener 114. The reduction may be such that deformation 138 is substantially prevented or completely eliminated from occurring on top portion 118 of fastener 114. In this illustrative example, cooling system 132 may be used to substantially prevent deformation 138 in dielectric material 122 associated with top portion 118 of fastener 114.

Cooling system 132 may be a device configured to cool top portion 118 of fastener 114 to stiffen top portion 118. In this illustrative example, cooling system 132 may be configured to cool dielectric material 122 in top portion 118 of fastener 114 to stiffen dielectric material 122 such that deformation 138 of dielectric material 122 may be reduced or eliminated. For example, without limitation, cooling system 132 may cool dielectric material 122 such that plastic deformation 139 is reduced or eliminated.

When dielectric material 122 is cooled, dielectric material 122 stiffens. Specifically, the modulus of elasticity of dielectric material 122 increases. This increase in the modulus of elasticity may make dielectric material 122 less prone to plastic deformation 139. In some cases, after dielectric material 122 is cooled, fastener 114 may be installed without plastically deforming dielectric material 122.

In some examples, when cooled, dielectric material 122 also may shrink due to its coefficient of thermal expansion. Similarly, when cooled, the material used to form fastener 114 may shrink due to its coefficient of thermal expansion. These coefficients of thermal expansion may be different from one another. As a result, dielectric material 122 may expand at a different rate or manner than fastener 114. Manufacturing parameters for fastener 114 with dielectric material 122 may take into account these issues to prevent inconsistencies from forming at the interface between head 117 of fastener 114 and dielectric material 122.

Cooling system 132 may comprise various components used to cool fastener 114. For example, without limitation, cooling system 132 may comprise at least one of dry ice, liquid nitrogen, a refrigerant, a cooler, a refrigeration unit, cooled air, or some other suitable type of component.

In this illustrative example, cooling system 132 may comprise chamber 142. Chamber 142 may be an enclosed space or compartment in cooling system 132. For example, chamber 142 may be the inside portion of a bag, a box, a drawer, a refrigeration unit, a cooler, a pressurized compartment, and other suitable types of compartments.

In this depicted example, some or all of fastener 114 may be placed in chamber 142 of cooling system 132. For instance, top portion 118 with dielectric material 122 and head 117 may be placed in chamber 142. In some cases, all of fastener 114, including shank 119, also may be placed in chamber 142. In another illustrative example, top portion 118, shank 119, or both may be cooled in some other manner using cooling system 132, depending on the particular implementation.

As depicted, cooling system 132 may then cool fastener 114 to temperature 144 such that top portion 118 of fastener 114 has desired level of stiffness 146. Specifically, cooling system 132 may cool dielectric material 122 associated with head 117 of fastener 114 such that dielectric material 122 has desired level of stiffness 146. Desired level of stiffness 146 may be a level of stiffness that provides a desirable performance for dielectric material 122 in top portion 118 of fastener 114 when installed in structure 104.

Temperature 144 may be selected based on material properties 140 of dielectric material 122. For example, without limitation, temperature 144 may be between about −100° F. and about −115° F. when dielectric material 122 is polyether ether ketone (PEEK) associated with a one-quarter inch diameter fastener. Other temperature ranges may be used for polyether ether ketone that provide the desired result to prevent plastic deformation 139. In other illustrative examples, temperature 144 may have a different range, depending on the type of dielectric material 122, the size of fastener 114, the thickness of dielectric material 122, or a combination thereof.

In this depicted example, temperature 144 may be reached after placing fastener 114 in chamber 142 for period of time 148. For example, without limitation, fastener 114 may be placed in chamber 142 of cooling system 132 for ten minutes to reach temperature 144 such that fastener 114 has desired level of stiffness 146.

In this illustrative example, desired level of stiffness 146 for dielectric material 122 may be a level of resistance to deformation 138 in response to force 136. In other words, dielectric material 122 in top portion 118 of fastener 114 may have desired level of stiffness 146 such that dielectric material 122 does not experience deformation 138 more than desired when force 136 is applied by tool 130 on fastener 114. As an example, desired level of stiffness 146 may be selected such that dielectric material 122 does not experience plastic deformation 139.

In this illustrative example, tool 130 may be configured to install fastener 114 in structure 104 after cooling such that deformation 138 in top portion 118 of fastener 114 may be reduced or eliminated. In particular, tool 130 may be configured to install fastener 114 after cooling dielectric material 122 such that deformation 138 in dielectric material 122 in top portion 118 of fastener 114 is reduced or eliminated.

When dielectric material 122 is cooled to have desired level of stiffness 146, fastener 114 may be installed in structure 104 such that top portion 118 of fastener 114 with dielectric material 122 lies within selected tolerances 135 of surface 133 of structure 104. In this manner, the aerodynamic performance of structure 104 may be increased while providing electromagnetic effect protection 126 by using dielectric material 122 in top portion 118 of fastener 114.

In this depicted example, tool 130, cooling system 132, or both may be configured to be operated by human operator 150, robotic device 152, or some other type of operator, depending on the particular implementation. For example, without limitation, human operator 150 may place fastener 114 in chamber 142 of cooling system 132 and remove fastener 114 from chamber 142 when temperature 144 is reached. Human operator 150 may then position fastener 114 relative to surface 133 of structure 104 and hold tool 130 to install fastener 114 in structure 104.

In another illustrative example, tool 130, cooling system 132, or both may be operated by robotic device 152. Robotic device 152 may be one that is configured to perform operations under the control of controller 154. Controller 154 may be hardware in this illustrative example, but may include firmware or software in other illustrative examples. For instance, controller 154 may be a processor unit or a computer system. Robotic device 152 may be controlled by controller 154 and also may receive input from human operator 150. Robotic device 152 may take the form of, for example, without limitation, a robotic arm.

When tool 130 is operated by robotic device 152, tool 130 may take the form of end effector 156 configured for use with robotic device 152. For example, without limitation, robotic device 152 may be configured to install fastener 114 in structure 104 using rivet gun 134. In this case, rivet gun 134 may be end effector 156 of robotic device 152.

With the use of fastener installation system 102 to cool and install fastener 114 in structure 104, deformation 138 of top portion 118 of fastener 114 with dielectric material 122 may be reduced or eliminated. As a result, more efficient and electromagnetically sound fastener systems may be installed in structure 104. Moreover, the aerodynamic performance of structure 104 in aircraft 108 may be increased, while still providing a desired level of electromagnetic effect protection 126 from events 125 that may be encountered by structure 104 in aircraft 108.

The illustration of fastener installation system 102 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For instance, cooling system 132 may include components in addition to or in place of chamber 142. For instance, cooling system 132 may include a sprayer configured to spray cool air to cool fastener 114. In other illustrative examples, fastener 114 may include other materials other than dielectric material 122 in top portion 118 of fastener 114. These materials also may be cooled to a desired level of stiffness to reduce deformation that may occur from the use of tool 130.

In some illustrative examples, cooling system 132 may be physically associated with robotic device 152. As an illustrative example, cooling system 132 may be attached to robotic device 152. Cooling system 132 may be configured to cool fastener 114 prior to installing fastener 114 using robotic device 152. As another illustrative example, cooling system 132 may be part of end effector 156 of robotic device 152.

In still other illustrative examples, cooling system 132 may be associated with rivet gun 134 when rivet gun 134 is operated by at least one of human operator 150 or robotic device 152. For instance, cooling system 132 may be part of rivet gun 134. In this case, chamber 142 of cooling system 132 may be configured to hold a portion of fastener 114 while another one of number of fasteners 112 is being installed in structure 104. As another example, cooling system 132 may spray cool air on top portion 118 of fastener 114 instead of placing fastener 114 in chamber 142. In this case, chamber 142 may house a cooling agent to cool the air to a desired temperature prior to spraying top portion 118 of fastener 114.

Although the illustrative examples are described with respect to aircraft 108, an illustrative embodiment may be applied to other types of platforms. In other illustrative examples, platform 106 may be, for example, without limitation, a mobile platform, a stationary platform, a land-based structure, an aquatic-based structure, and a space-based structure. More specifically, platform 106 may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 2:
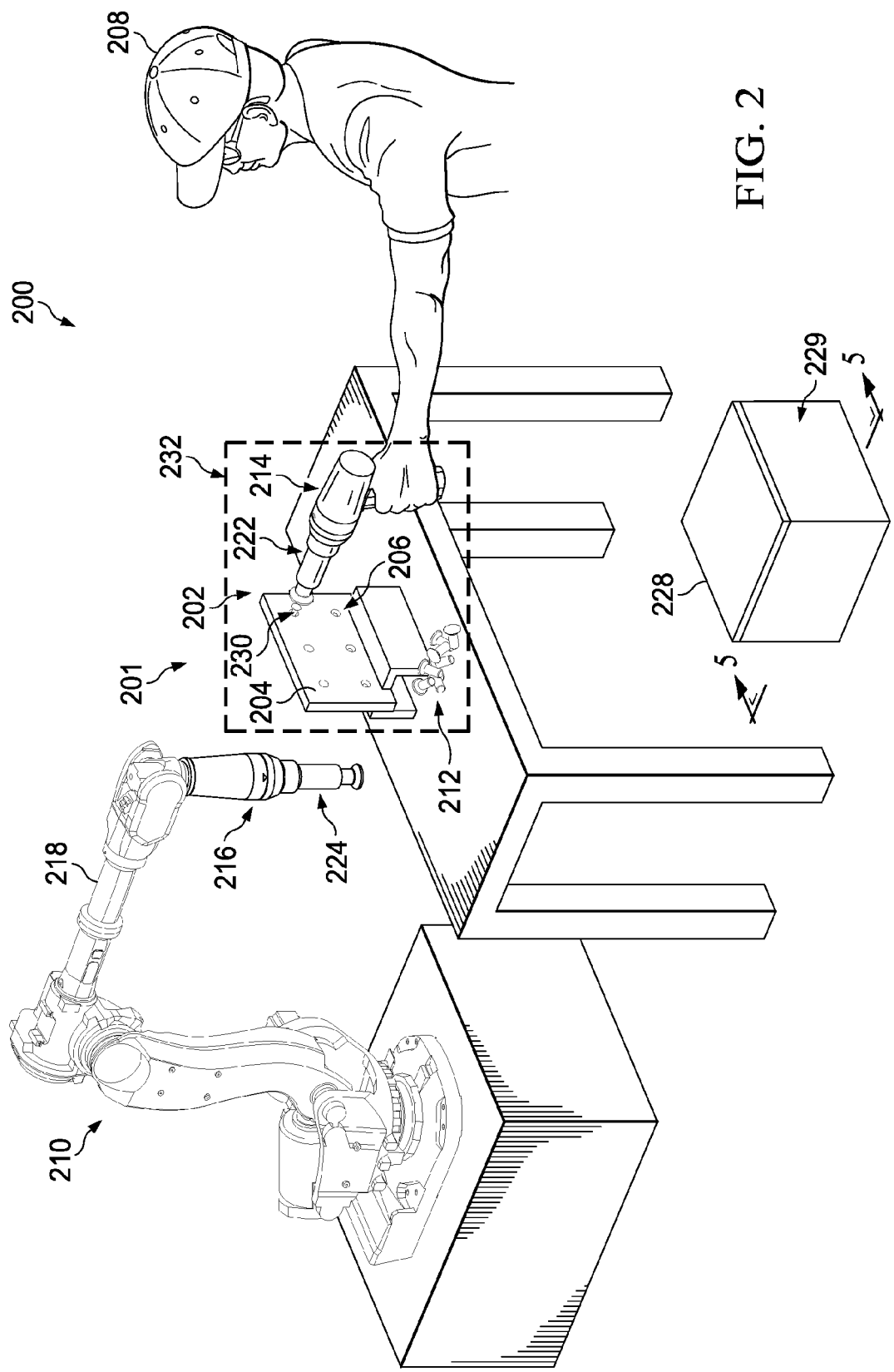
FIG. 2 is an illustration of a manufacturing environment in accordance with an illustrative embodiment.

With reference now to FIG. 2, an illustration of a manufacturing environment is depicted in accordance with an illustrative embodiment. Manufacturing environment 200 may include fastener installation system 201. Manufacturing environment 200 with fastener installation system 201 may be an example of one implementation for manufacturing environment 100 with fastener installation system 102 shown in block form in FIG. 1.

As illustrated, manufacturing environment 200 may include structure 202 with surface 204 and holes 206 drilled in surface 204. Structure 202 with surface 204 and holes 206 may be an example of an implementation for structure 104 with surface 133 and holes 113 shown in block form in FIG. 1.

Human operator 208 and robotic device 210 may be present in manufacturing environment 200 and configured to install fasteners 212 in holes 206 using tool 214 and tool 216, respectively, in fastener installation system 201. Human operator 208 with tool 214 may be an example of a physical implementation of human operator 150 using tool 130 shown in block form in FIG. 1. Robotic device 210 with tool 216 may be an example of a physical implementation of robotic device 152 using tool 130 shown in block form in FIG. 1. In this depicted example, robotic device 210 takes the form of robotic arm 218.

As depicted, holes 206 in structure 202 may be configured to receive fasteners 212. Fasteners 212 may be an example of an implementation for number of fasteners 112 in FIG. 1.

In this illustrative example, tool 214 and tool 216 may take the form of rivet gun 222 and rivet gun 224, respectively, used to drive fasteners 212 into structure 202. Each of fasteners 212 may be an example of an implementation for fastener 114 in FIG. 1, while rivet gun 222 and rivet gun 224 may be examples of implementations for rivet gun 134 in FIG. 1.

As illustrated, fastener installation system 201 may include cooling system 228. Prior to installation in structure 202, fasteners 212 may be positioned within chamber 229 of cooling system 228. Cooling system 228 with chamber 229 may be an example of an implementation for cooling system 132 with chamber 142 shown in block form in FIG. 1.

Figure 6:
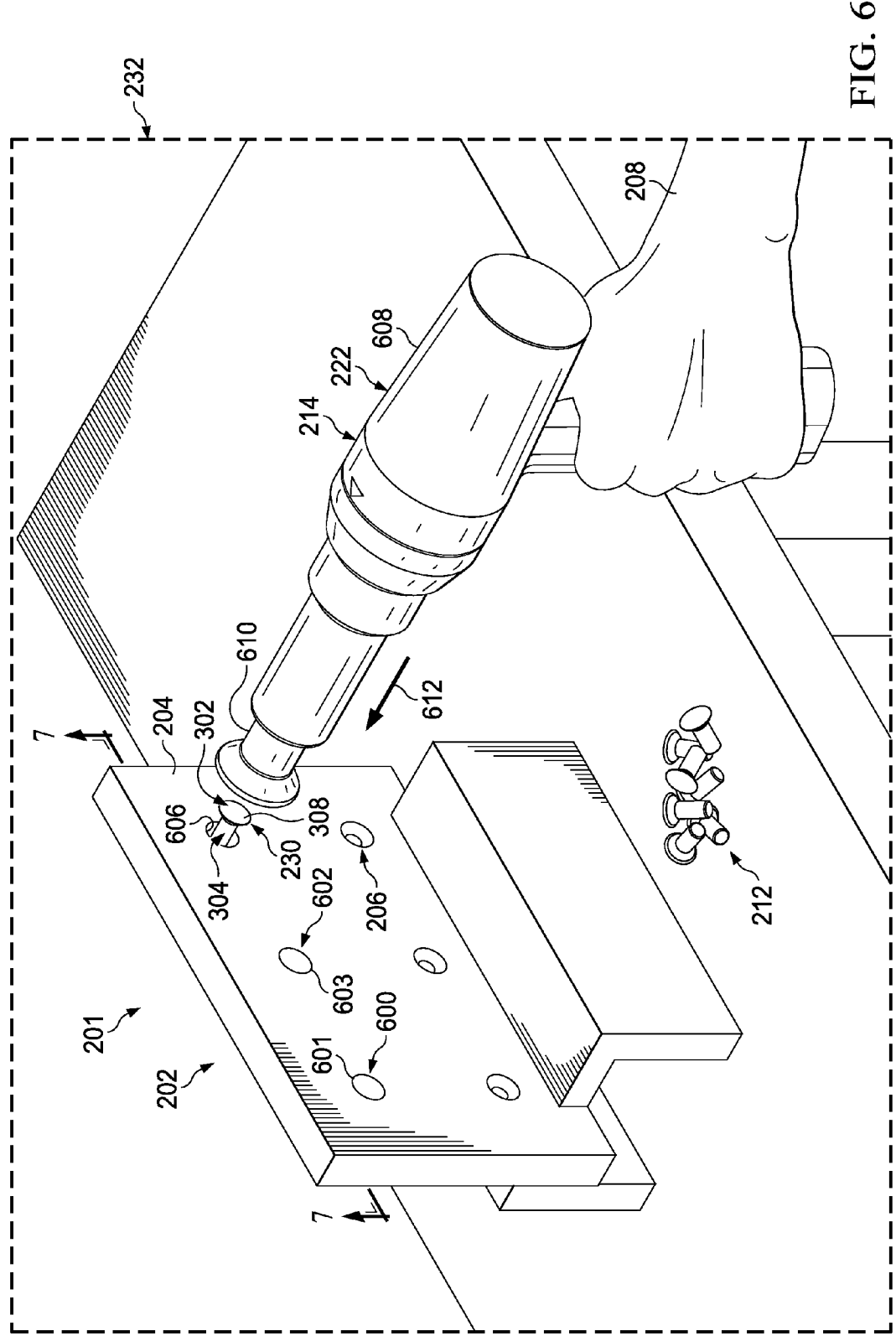
FIG. 6 is an illustration of a rivet gun used to install fasteners in a structure in accordance with an illustrative embodiment.

In this illustrative example, fasteners 212 may be cooled by cooling system 228 to stiffen the top portion of fasteners 212. Fasteners 212 may then be installed in structure 202 using at least one of rivet gun 222 and rivet gun 224 without deforming the material used to make fasteners 212. Specifically, fastener 230 in fasteners 212 may be installed in structure 202 using rivet gun 222. A more detailed illustration of human operator 208 with rivet gun 222 in section 232 of manufacturing environment 200 is shown in FIG. 6.

Turning next to FIG. 3, an illustration of fastener 230 from FIG. 2 with electromagnetic effect protection is depicted in accordance with an illustrative embodiment. In this depicted example, a more detailed view of fastener 230 is shown.

As depicted, fastener 230 may be configured to be installed in one of holes 206 in structure 202 by human operator 208 or robotic device 210 from FIG. 2. In this illustrative example, fastener 230 may include top portion 302, head 306, and shank 304. Top portion 302 may include dielectric material 308. Top portion 302, head 306, and shank 304 of fastener 230 may be examples of implementations for top portion 118, head 117, and shank 119 of fastener 114 in FIG. 1. Shank 304 may be configured to be interference fit with a cylindrical portion of one of holes 206, while head 306 may be received by a countersink in the hole.

As illustrated, dielectric material 308 may be an example of an implementation for dielectric material 122 shown in block form in FIG. 1. In this illustrative example, dielectric material 308 may be associated with head 306 of fastener 230. For instance, a layer of dielectric material 308 may be formed on top of head 306 of fastener 230 and subsequently hardened. In other illustrative examples, dielectric material 308 may be injection molded to form top portion 302 of fastener 230.

Dielectric material 308 may form dielectric cap 310 in this illustrative example. Dielectric cap 310 may be an example of an implementation for dielectric cap 123 shown in block form in FIG. 1. Dielectric cap 310 may be mechanically interlocked with fastener 230.

With reference now to FIG. 4, an illustration of a cross-sectional view of fastener 230 with electromagnetic effect protection taken along lines 4-4 in FIG. 3 is depicted in accordance with an illustrative embodiment. In this depicted example, dielectric cap 310 is shown on head 306 of fastener 230.

As depicted, dielectric cap 310 may provide electromagnetic effect protection for fastener 230. A portion of dielectric material 122 in dielectric cap 310 may fill at least a portion of one of holes 206 in FIG. 2 (not shown) in this illustrative example. Dielectric cap 310 also may provide a substantially smooth surface for fastener 230 when installed in structure 202 in FIG. 2 and substantially no deformation, inconsistencies, or both are present in dielectric material 308. Specifically, upper surface 400 of dielectric cap 310 may lie within selected tolerances of surface 204 of structure 202 in FIG. 2 when fastener 230 is installed in structure 202 and substantially no deformation is present.

In this illustrative example, dielectric material 308 in dielectric cap 310 may not have a desired stiffness to withstand a force exerted on fastener 230 by tool 214 or tool 216 from FIG. 2 during installation in structure 202. As a result, fastener 230 may need to be cooled prior to installation to stiffen dielectric material 308 such that deformation, inconsistencies, or both in are reduced or eliminated.

Figure 5:
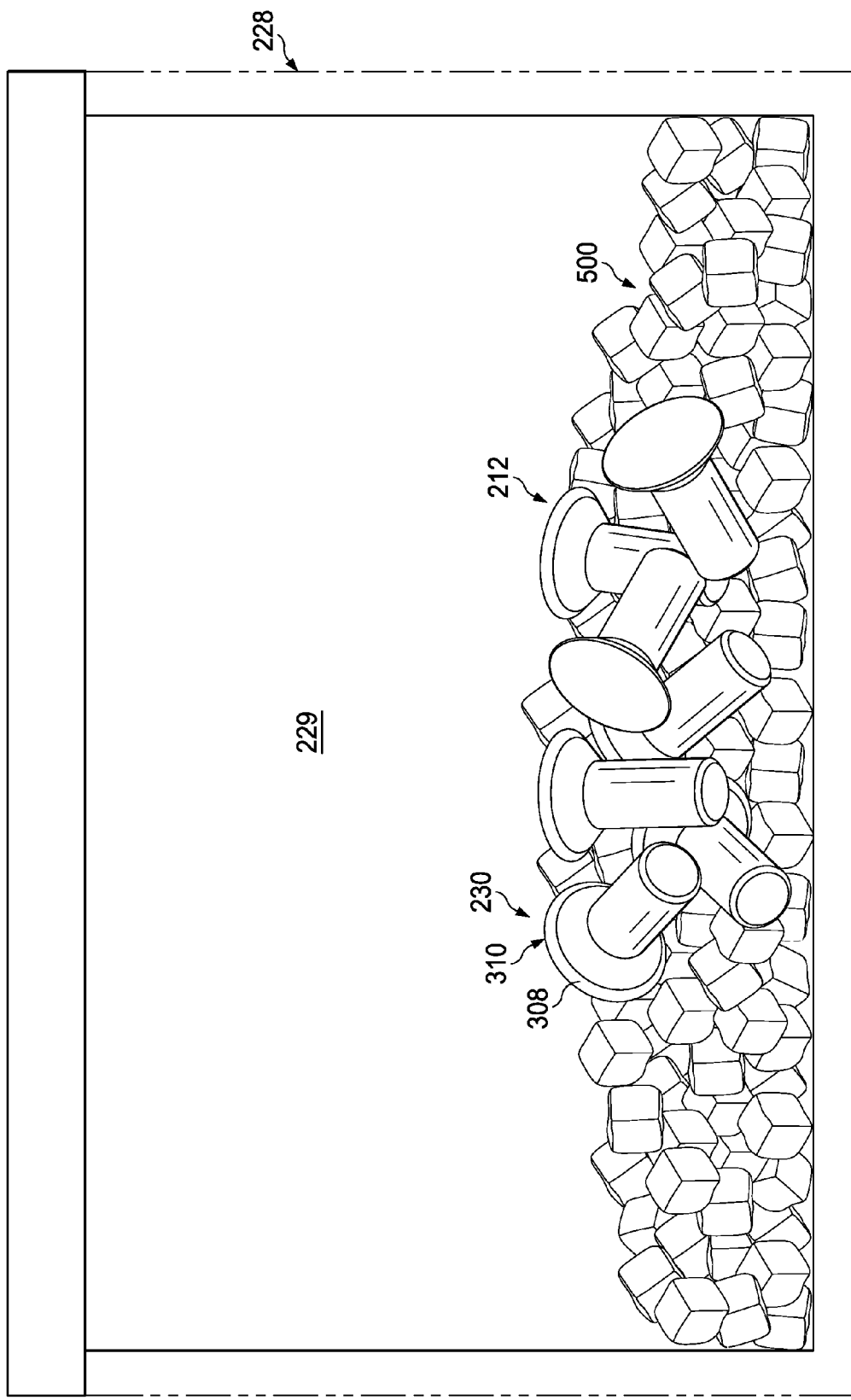
FIG. 5 is an illustration of a cooling system with fasteners in accordance with an illustrative embodiment.

Turning next to FIG. 5, an illustration of cooling system 228 shown in the direction of lines 5-5 in FIG. 2 is depicted in accordance with an illustrative embodiment. Fasteners 212 have been placed within chamber 229 of cooling system 228 prior to installation in structure 202. In this depicted example, chamber 229 of cooling system 228 may include dry ice 500.

As illustrated, dry ice 500 may be positioned within chamber 229. Dry ice 500 may be used to cool fasteners 212. For example, without limitation, dry ice 500 may be used to cool fastener 230 to a temperature such that dielectric material 308 on fastener 230 has a desired level of stiffness before installing fastener 230 in structure 202 in FIG. 2. In other illustrative examples, other types of cooling mechanisms other than dry ice 500 may be used, depending on the particular implementation.

In this depicted example, fasteners 212 may be held in chamber 229 of cooling system 228 for a period of time until installed in structure 202. At least one of robotic device 210 and human operator 208 from FIG. 2 may remove fasteners 212 from cooling system 228 for installation.

With reference next to FIG. 6, an illustration of rivet gun 222 used to install fasteners 212 in structure 202 from FIG. 2 is depicted in accordance with an illustrative embodiment. In this view, rivet gun 222, structure 202 with holes 206, and human operator 208 within section 232 from FIG. 2 are shown in greater detail.

As depicted, fastener 600 and fastener 602 have been installed in hole 601 and hole 603, respectively, in structure 202 using rivet gun 222. Prior to being installed, fastener 600 and fastener 602 may have been cooled using cooling system 228 from FIG. 2. Fastener 600 and fastener 602 may be examples of implementations for fastener 114, after being installed in structure 104, shown in block form in FIG. 1.

For example, without limitation, fastener 600 and fastener 602 may have been cooled at a temperature between about −100° F. and about −115° F. for about ten minutes in this illustrative example, when the dielectric material used on fastener 600 and fastener 602 is polyether ether ketone and fastener 600 and fastener 602 have a one-quarter inch diameter. When other types of dielectric materials, varying thicknesses of dielectric material, or both, are used, other temperature ranges and time periods may provide desired results. As an example, when the thickness of the dielectric material increases, the cooling time also may increase.

In this illustrative example, fastener 230 has been removed from cooling system 228, as shown in FIG. 5, and placed into hole 606 in structure 202. In particular, shank 304 of fastener 230 may be positioned within hole 606 drilled in structure 202.

As illustrated, rivet gun 222 may include body 608 and riveting mechanism 610. Riveting mechanism 610 may be positioned relative to top portion 302 of fastener 230. Human operator 208 may activate rivet mechanism 610 to apply a force (not shown) in the direction of arrow 612 on top portion 302 of fastener 230 to drive fastener 230 into structure 202. For instance, human operator 208 may press a trigger (not shown in this view) to activate riveting mechanism 610.

Figure 7:
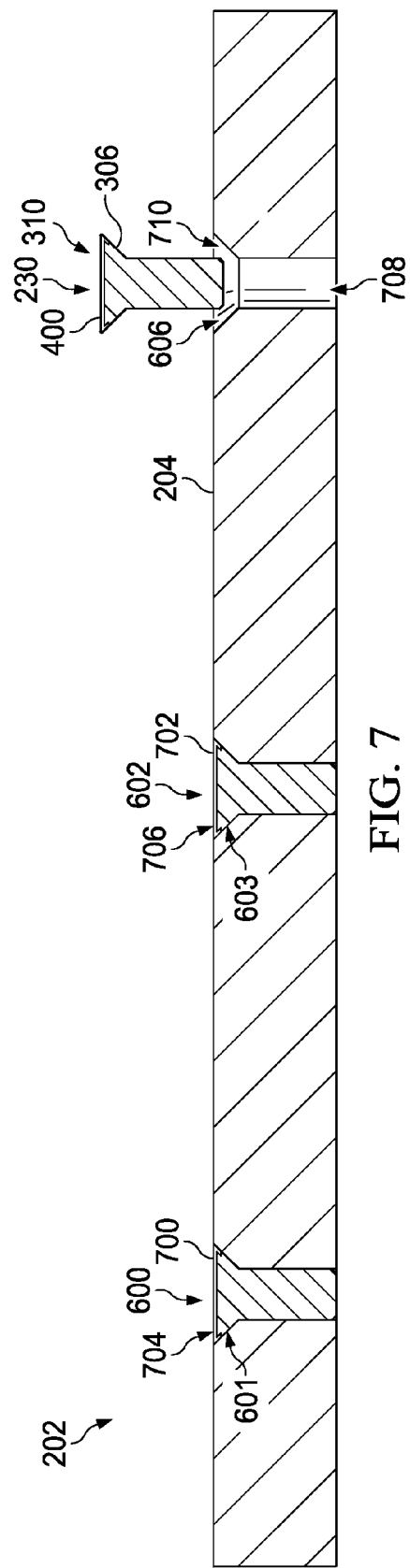
FIG. 7 is an illustration of a cross-sectional view of a structure with fasteners installed in the structure in accordance with an illustrative embodiment.

Turning next to FIG. 7, an illustration of a cross-sectional view of structure 202 with fastener 600 and fastener 602 installed in structure 202 taken along lines 7-7 in FIG. 6 is depicted in accordance with an illustrative embodiment. In this depicted example, dielectric material 700 may be associated with fastener 600 installed in hole 601. Dielectric material 702 may be associated with fastener 602 installed in hole 603.

In this illustrative example, dielectric material 700 may form dielectric cap 704 for fastener 600. Dielectric material 702 may form dielectric cap 706 for fastener 602.

In this depicted example, fastener 230 is about to be installed in hole 606. Hole 606 may have cylindrical portion 708 and countersink 710 near surface 204 of structure 202. In this illustrative example, cylindrical portion 708 may receive shank 304 of fastener 230, while countersink 710 may receive head 306 of fastener 230 with dielectric cap 310. Countersink 710 may have a depth to take into account the thickness of dielectric cap 310 such that upper surface 400 of dielectric cap 310 lies substantially flush with surface 204 of structure 202 in this illustrative example.

Figure 8:
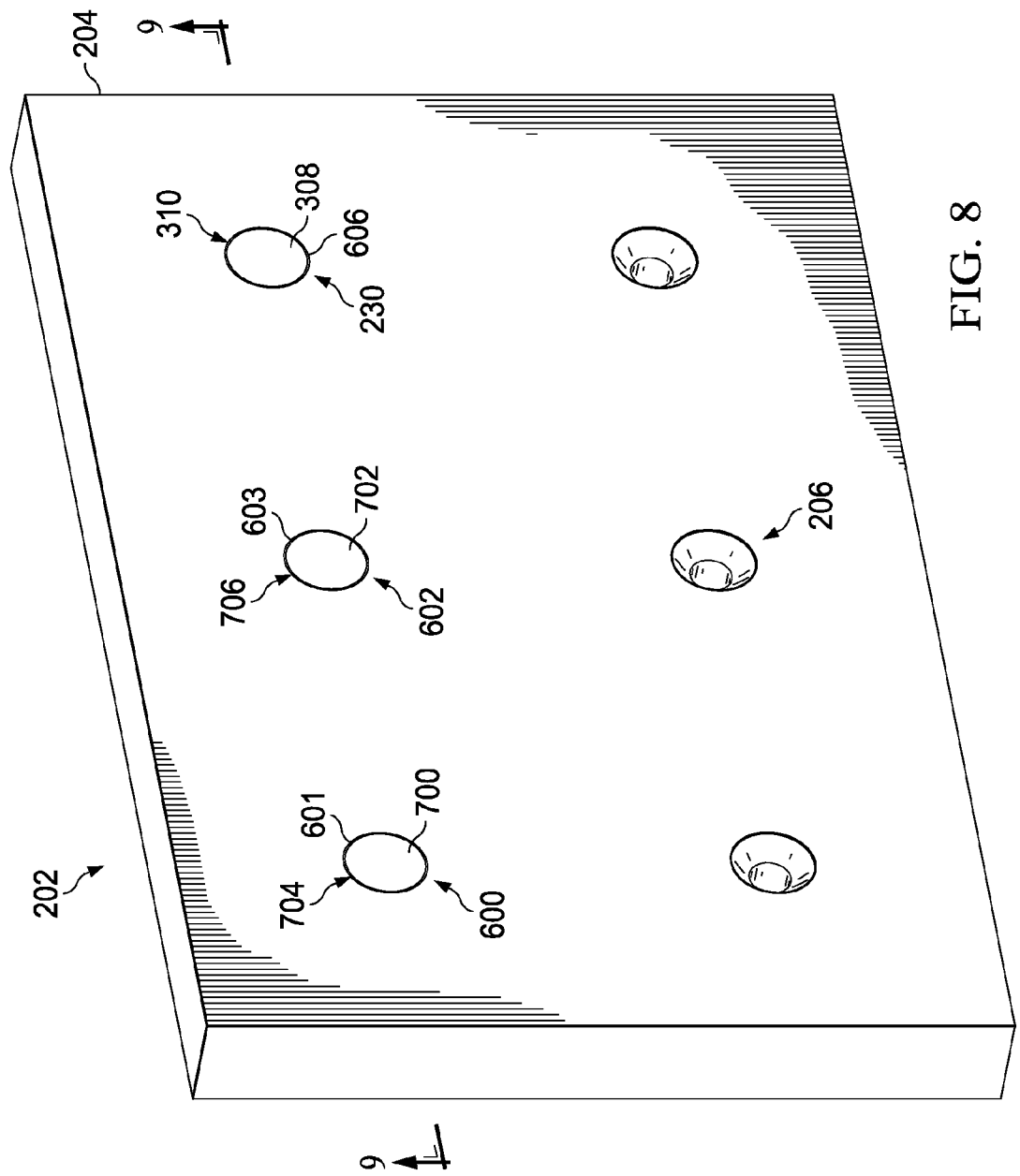
FIG. 8 is an illustration of a perspective view of a structure with fasteners installed in the structure in accordance with an illustrative embodiment.

In FIG. 8, an illustration of a perspective view of structure 202 from FIG. 6 with fastener 230, fastener 600, and fastener 602 installed in hole 606, hole 601, and hole 603, respectively. In this depicted example, shank 304 of fastener 230 has been forced into cylindrical portion 708 of hole 606 to create an interference fit between shank 304 and the inner surface of cylindrical portion 708 of hole 606.

As depicted, head 306 of fastener 230 with dielectric cap 310 has been received by countersink 710 such that dielectric cap 310 fills the space between head 306 and the inner surface of countersink 710. In this manner, dielectric cap 310 seals fastener 230 from penetration by electric charges.

Figure 9:
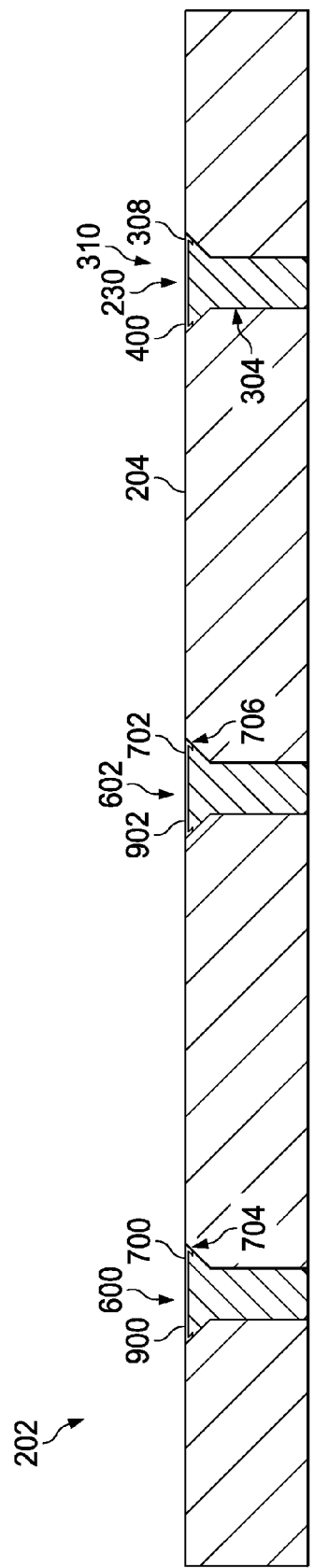
FIG. 9 is an illustration of a cross-sectional view of a structure in accordance with an illustrative embodiment.

Turning now to FIG. 9, an illustration of a cross-sectional view of structure 202 taken along the lines 9-9 in FIG. 8 is depicted in accordance with an illustrative embodiment. In this depicted example, because dielectric material 308, dielectric material 700, and dielectric material 702 were cooled before installation, these materials may not experience plastic deformation as a result of being installed by rivet gun 222 in FIG. 6. In other words, the configuration or topography of dielectric material 308, dielectric material 700, and dielectric material 702 may not change during installation. As a result, upper surface 400 of dielectric cap 310, upper surface 900 of dielectric cap 704, and upper surface 902 of dielectric cap 706 may lie within selected tolerances of surface 204 of structure 202.

Further, the risk of undesired inconsistencies forming within dielectric material 308, dielectric material 700, and dielectric material 702 may be reduced. In other words, the risk of inconsistencies outside selected tolerances is reduced by cooling dielectric material 308, dielectric material 700, and dielectric material 702. As a result, dielectric material 308, dielectric material 700, and dielectric material 702 may provide a desired amount of electromagnetic effect protection and seal each fastener from penetration by electric charges.

The illustrations of fastener installation system 201 and the components within fastener installation system 201 in FIGS. 2-9 are not meant to imply physical or architectural limitations to the manner in which an illustrative embodiment may be implemented. Other components in addition to or in place of the ones illustrated may be used. Some components may be optional.

The different components shown in FIGS. 2-9 may be illustrative examples of how components shown in block form in FIG. 1 can be implemented as physical structures. Additionally, some of the components in FIGS. 2-9 may be combined with components in FIG. 1, used with components in FIG. 1, or a combination of the two.

For instance, although cooling system 228 is shown with dry ice 500 in FIG. 5, various cooling mechanisms may be integrated in cooling system 228 to cool fasteners 212. As an illustrative example, cooling system 228 may take the form of a refrigeration unit.

In another illustrative example, a cooling agent may be directed toward the dielectric material on each of fasteners 212 before installation. This cooling agent may be air in some illustrative examples.

In still other illustrative examples, an additional cooling system may be associated with robotic device 210. Some of fasteners 212 may be placed in the cooling system associated with robotic device 210 and stored until installation in structure 202.

As another illustrative examples, fasteners 212 may comprise other types of fasteners in addition to or in place of fasteners 212. For instance, in some illustrative examples, rivets may be installed in structure 202 using at least one of tool 214 or tool 216. Further, although FIGS. 6-9 show fastener 230, fastener 600, and fastener 602 installed by human operator 208 using rivet gun 222, any of fasteners 212 may be installed by robotic device 210 using rivet gun 224 in a similar manner.

Figure 10:
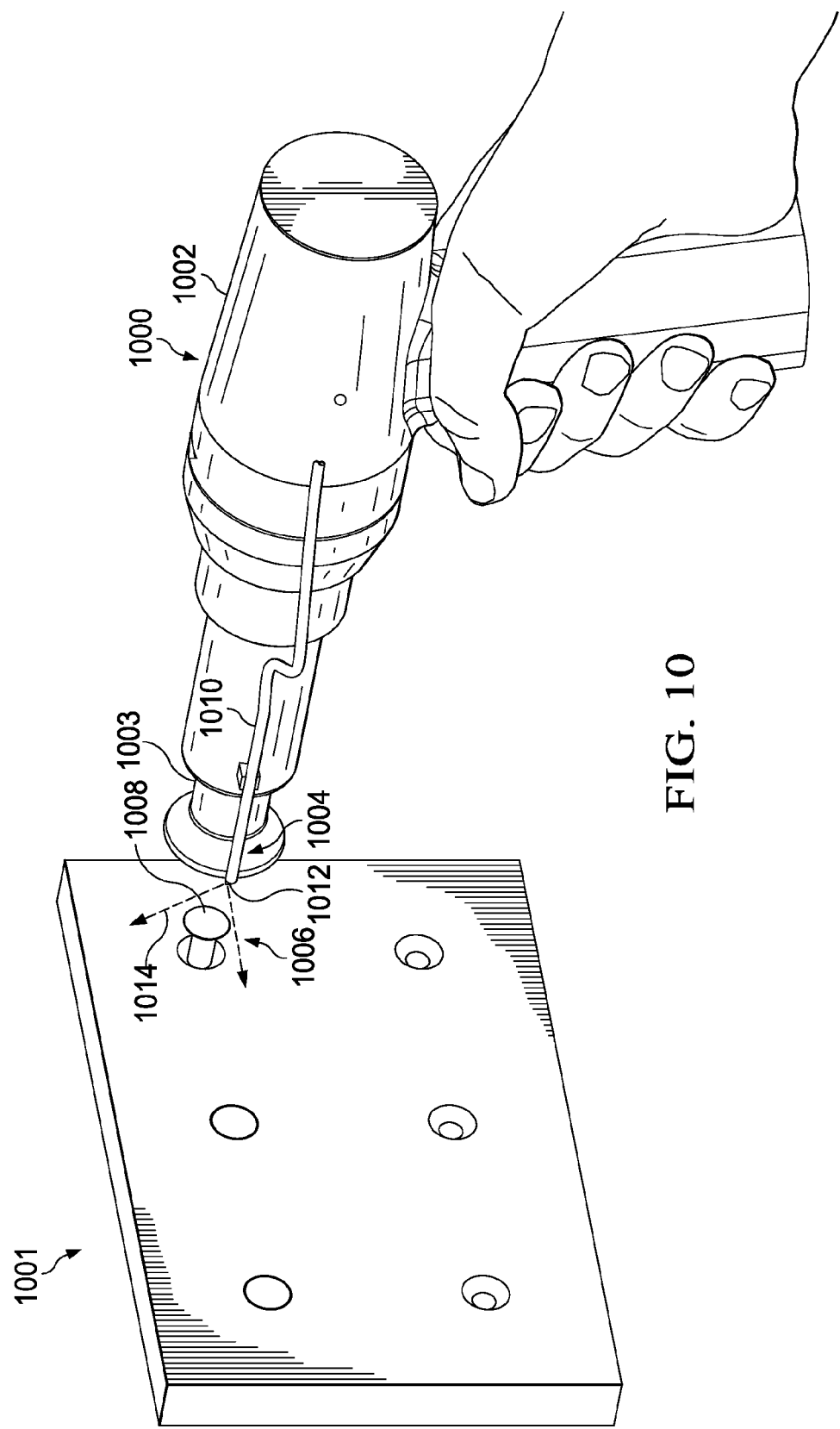
FIG. 10 is an illustration of a rivet gun with a cooling system physically associated with the rivet gun in accordance with an illustrative embodiment.

With reference next to FIG. 10, an illustration of a rivet gun with a cooling system physically associated with the rivet gun is depicted in accordance with an illustrative embodiment. In this depicted example, rivet gun 1000 may be positioned with respect to structure 1001. Rivet gun 1000 and structure 1001 may be examples of implementations for rivet gun 134 and structure 104 shown in block form in FIG. 1.

As illustrated, rivet gun 1000 includes body 1002 and riveting mechanism 1003. In this illustrative example, rivet gun 1000 may be associated with cooling system 1004 used to cool fastener 1006 with dielectric material 1008 on top of fastener 1006. Cooling system 1004, fastener 1006, and dielectric material 1008 may be examples of implementations for cooling system 132, fastener 114, and dielectric material 122, respectively, from FIG. 1. Dielectric material 1008 may be cooled prior to installation of fastener 1006 in structure 1001 using rivet gun 1000.

As depicted, cooling system 1004 may comprise sprayer 1010. Sprayer 1010 may have nozzle 1012 configured to direct cooling agent 1014 onto dielectric material 1008 on top of fastener 1006. Cooling agent 1014 may take the form of cold air in this illustrative example. Dielectric material 1008 may be cooled to a temperature such that dielectric material 1008 may resist deformation when installed in structure 1001.

Figure 11:
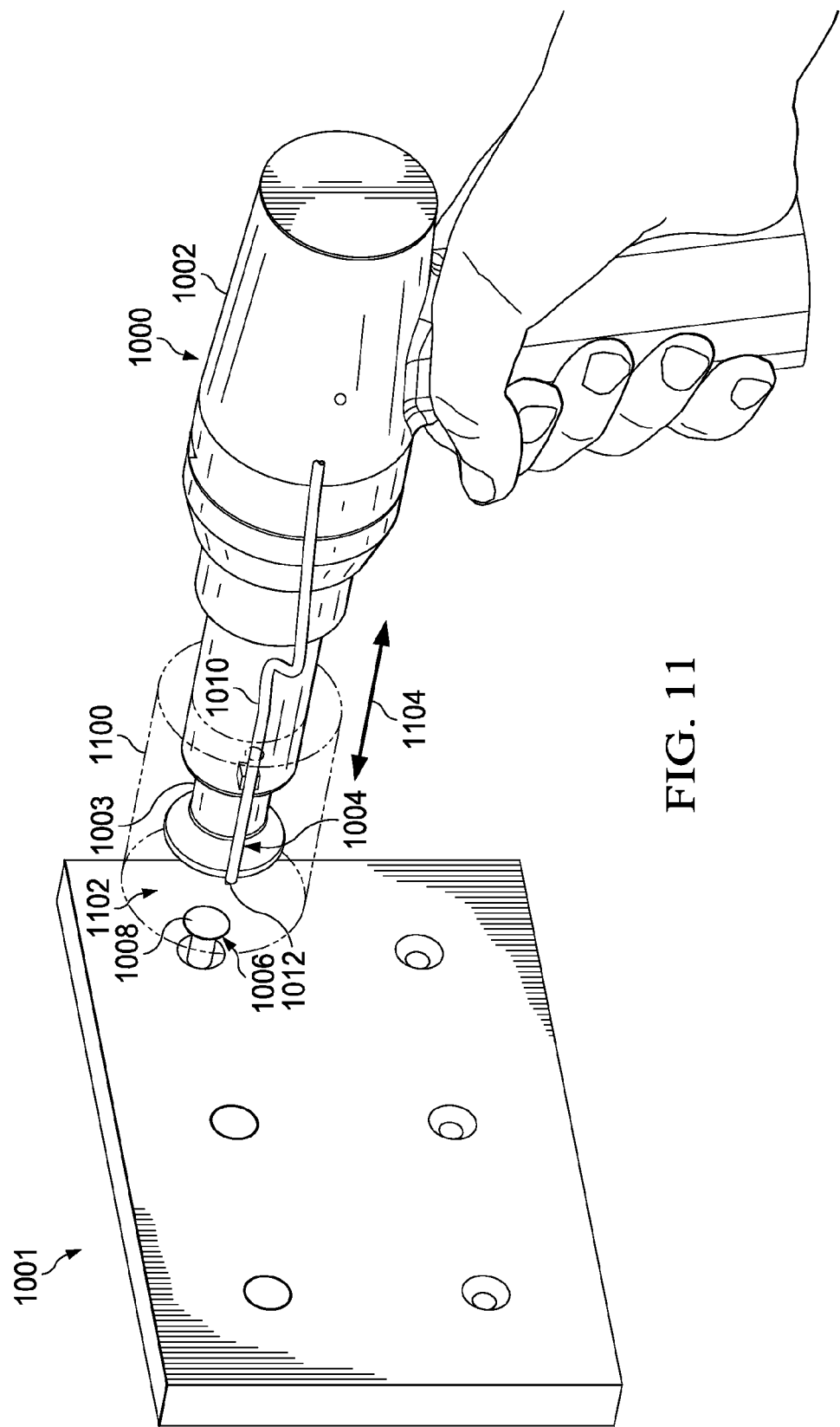
FIG. 11 is an illustration of a rivet gun with a cooling system physically associated with the rivet gun in accordance with an illustrative embodiment.

Turning now to FIG. 11, an illustration of rivet gun 1000 with cooling system 1004 physically associated with rivet gun 1000 from FIG. 10 is depicted in accordance with an illustrative embodiment. In this depicted example, cap 1100 has been added to cooling system 1004.

As depicted, cap 1100 may be positioned against structure 1001. Cap 1100 may be positioned by an operator in this illustrative example.

Cap 1100 may be configured to keep cooling agent 1014 (not shown in this view) directed toward dielectric material 1008 on fastener 1006 within space 1102. As a result, dielectric material 1008 may be cooled more quickly than when cap 1100 is not present. In some illustrative examples, nozzle 1012 may be absent from cooling system 1004.

Cap 1100 may be movably connected to riveting mechanism 1003 in this illustrative example. Cap 1100 may move back and forth in the direction of arrow 1104. For instance, cap 1100 may be moved to be placed against structure 1001. An operator also may move cap 1100 back to allow the operator to visually align fastener 1006 with rivet gun 1000. Cooling agent 1014 may be directed toward dielectric material 1008 before installation, during installation, or both.

Figure 12:
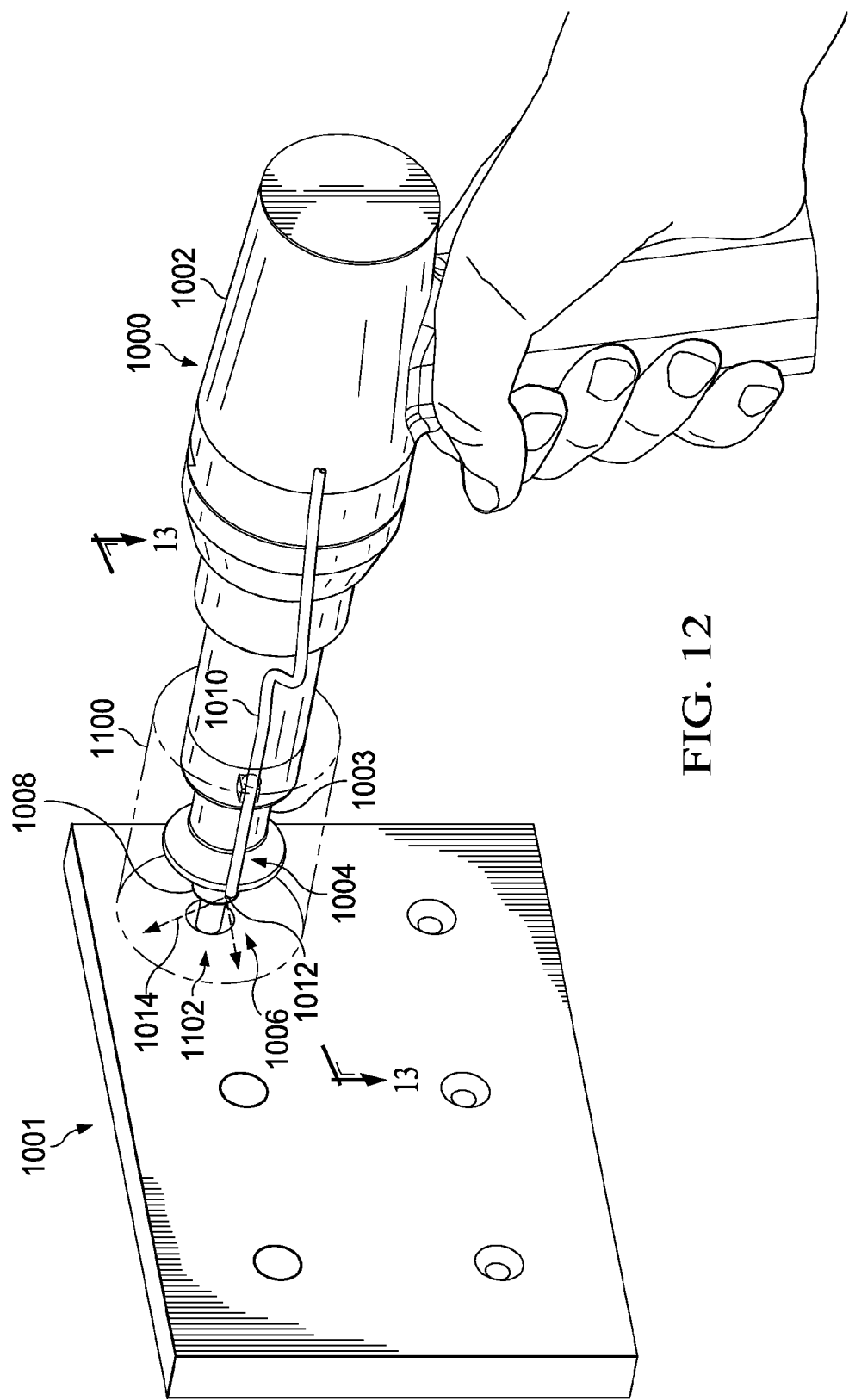
FIG. 12 is an illustration of a rivet gun with a cooling system physically associated with the rivet gun in accordance with an illustrative embodiment.

With reference now to FIG. 12, an illustration of rivet gun 1000 with cooling system 1004 physically associated with rivet gun 1000 from FIG. 11 is depicted in accordance with an illustrative embodiment. In this depicted example, cap 1100 has been moved toward structure 1001. Fastener 1006 has been received by space 1102 in cap 1100.

In FIG. 13, an illustration of a cross-sectional view of rivet gun 1000 with cooling system 1004 taken along the lines 13-13 in FIG. 12 is depicted in accordance with an illustrative embodiment. In this depicted example, cooling agent 1014 may be directed toward dielectric material 1008 on top of fastener 1006. When cooling system 1004 cools dielectric material 1008 to a desired level of stiffness, riveting mechanism 1003 may be activated to drive fastener 1006 into structure 1001. Riveting mechanism 1003 may move in the direction of arrow 1300.

In this case, the desired level of stiffness may be determined based on the type of dielectric material selected for dielectric material 1008. The desired level of stiffness is a stiffness that resists plastic deformation of, or inconsistencies in, dielectric material 1008 in this illustrative example. The cooling time needed to reach the desired level of stiffness may depend on the thickness of dielectric material 1008, the size of fastener 1006, other parameters, or a combination thereof.

Referring next to FIG. 14, an illustration of a cross-sectional view of rivet gun 1000 with cooling system 1004 from FIG. 13 is depicted in accordance with an illustrative embodiment. In this depicted example, riveting mechanism 1003 has moved in the direction of arrow 1300 in FIG. 13 to drive fastener 1006 into structure 1001. Because dielectric material 1008 on top of fastener 1006 has been cooled, deformation of dielectric material 1008 may be reduced or eliminated when fastener 1006 is installed in structure 1001.

The illustrations of rivet gun 1000 with cooling system 1004 shown in FIGS. 10-14 are not meant to imply physical or architectural limitations to the manner in which an illustrative embodiment may be implemented. Other components in addition to or in place of the ones illustrated may be used. Some components may be optional. For example, without limitation, other configurations of sprayer 1010, nozzle 1012, and cap 1100 shown in FIGS. 10-14 may be used to stiffen a polymer top of fastener 1006 or other fasteners to be installed in structure 1001.

Figure 15:
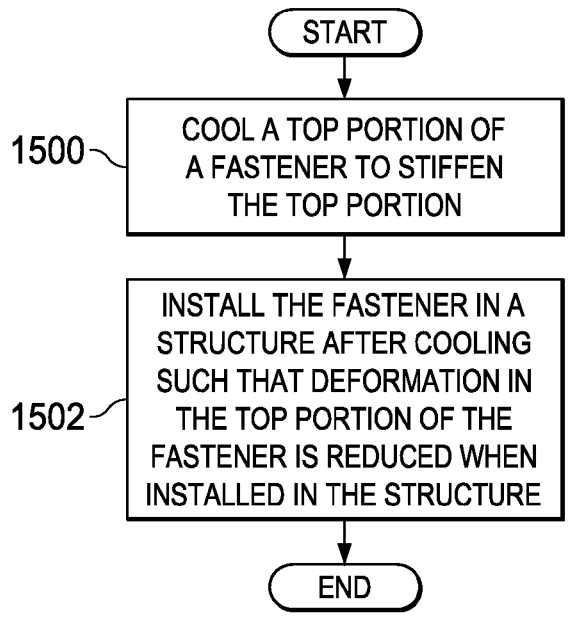
FIG. 15 is an illustration of a flowchart of a process for installing a fastener in accordance with an illustrative embodiment.

With reference now to FIG. 15, an illustration of a flowchart of a process for installing a fastener is depicted in accordance with an illustrative embodiment. The process illustrated in FIG. 15 may be implemented by fastener installation system 102 to install fastener 114 with dielectric material 122 in top portion 118 of fastener 114 in structure 104 in FIG. 1.

The process may begin by cooling top portion 118 of fastener 114 to stiffen top portion 118 (operation 1500). In this illustrative example, top portion 118 may be cooled by cooling system 132 to stiffen dielectric material 122 in top portion 118.

Next, the process may install fastener 114 in structure 104 after cooling such that deformation 138 in top portion 118 of fastener 114 is reduced when installed in structure 104 (operation 1502) with the process terminating thereafter. In some examples, plastic deformation 139 may be reduced or eliminated on top portion 118 of fastener 114.

Figure 16:
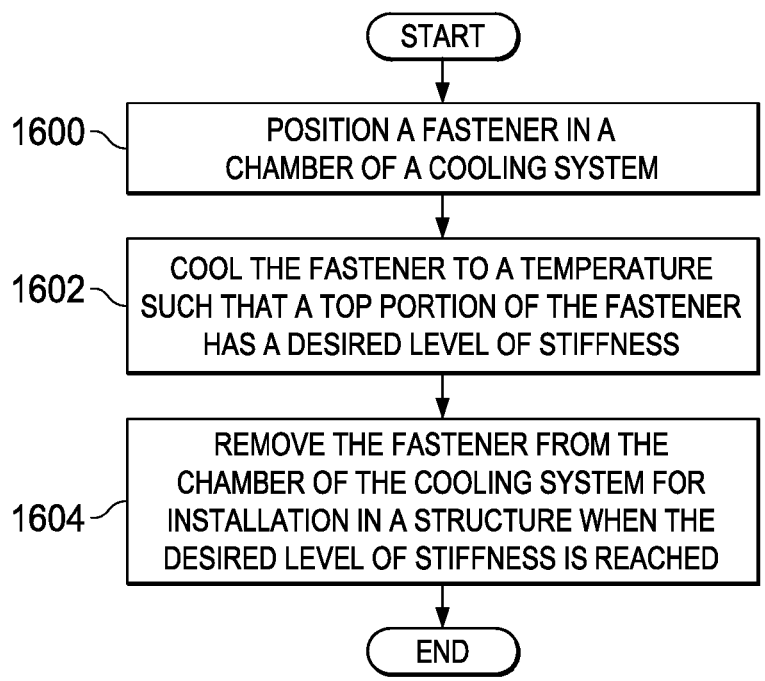
FIG. 16 is an illustration of a flowchart of a process for cooling a fastener in accordance with an illustrative embodiment.

Turning next to FIG. 16, an illustration of a flowchart of a process for cooling a fastener is depicted in accordance with an illustrative embodiment. The process illustrated in FIG. 16 may be implemented by cooling system 132 in operation 1500 in FIG. 15 to cool fastener 114 such that dielectric material 122 in top portion 118 of fastener 114 has desired level of stiffness 146 as shown in FIG. 1.

The process may begin by positioning fastener 114 in chamber 142 of cooling system 132 (operation 1600). Next, the process may cool fastener 114 to temperature 144 such that top portion 118 of fastener 114 has desired level of stiffness 146 (operation 1602).

The process may then remove fastener 114 from chamber 142 of cooling system 132 for installation in structure 104 when desired level of stiffness 146 is reached (operation 1604) with the process terminating thereafter. Desired level of stiffness 146 may be reached after fastener 114 has been placed in chamber 142 for period of time 148 in FIG. 1.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The illustrative embodiments of the disclosure may be described in the context of aircraft manufacturing and service method 1700 as shown in FIG. 17 and aircraft 1800 as shown in FIG. 18. Turning first to FIG. 17, an illustration of an aircraft manufacturing and service method is depicted in the form of a block diagram in accordance with an illustrative embodiment. During pre-production, aircraft manufacturing and service method 1700 may include specification and design 1702 of aircraft 1800 in FIG. 18 and material procurement 1704.

During production, component and subassembly manufacturing 1706 and system integration 1708 of aircraft 1800 in FIG. 18 takes place. Thereafter, aircraft 1800 in FIG. 18 may go through certification and delivery 1710 in order to be placed in service 1712. While in service 1712 by a customer, aircraft 1800 in FIG. 18 is scheduled for routine maintenance and service 1714, which may include modification, reconfiguration, refurbishment, and other maintenance or service.

Each of the processes of aircraft manufacturing and service method 1700 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in the form of a block diagram in which an illustrative embodiment may be implemented. In this example, aircraft 108 in FIG. 1 may be an example of aircraft 1800 described herein. Structure 104 in FIG. 1 may be a structure configured to be installed in aircraft 1800.

As illustrated, aircraft 1800 is produced by aircraft manufacturing and service method 1700 in FIG. 17 and may include airframe 1802 with plurality of systems 1804 and interior 1806. Examples of systems 1804 include one or more of propulsion system 1808, electrical system 1810, hydraulic system 1812, and environmental system 1814. Any number of other systems may be included. Although an aerospace example is shown, different illustrative embodiments may be applied to other industries, such as the automotive industry.

In one illustrative example, components or subassemblies produced in component and subassembly manufacturing 1706 in FIG. 17 may be fabricated or manufactured in a manner similar to components or subassemblies produced while aircraft 1800 is in service 1712 in FIG. 17. As yet another example, one or more apparatus embodiments, method embodiments, or a combination thereof may be utilized during production stages, such as component and subassembly manufacturing 1706 and system integration 1708 in FIG. 17. One or more apparatus embodiments, method embodiments, or a combination thereof may be utilized while aircraft 1800 is in service 1712, during maintenance and service 1714 in FIG. 17, or a combination thereof. The use of a number of the different illustrative embodiments may substantially expedite the assembly, reduce the cost of aircraft 1800, or both.

Apparatuses and methods embodied herein may be employed during at least one of the stages of aircraft manufacturing and service method 1700 in FIG. 17. In particular, fastener installation system 102 with tool 130 and cooling system 132 from FIG. 1 may be used to install fastener 114 in structure 104 during various stages of aircraft manufacturing and service method 1700. Specifically, cooling system 132 may be used during at least one of component and subassembly manufacturing 1706, system integration 1708, in-service 1712, or maintenance and service 1714.

For example, without limitation, fastener installation system 102 may be used to cool fastener 114 and install fastener 114 in structure 104 in airframe 1802 during at least one of component and subassembly manufacturing 1706, system integration 1708, in-service 1712, routine maintenance and service 1714, or some other stage of aircraft manufacturing and service method 1700. In this manner, fastener installation system 102 may provide electromagnetic effect protection 126 for aircraft 1800 using dielectric material 122 attached to each of fasteners 212.

Thus, the illustrative embodiments provide a method and system for installing fastener 114. In an illustrative example, top portion 118 of fastener 114 may be cooled to stiffen top portion 118. In particular, dielectric material 122 associated with top portion 118 of fastener 114 may be cooled to stiffen dielectric material 122. Fastener 114 may then be installed in structure 104 after cooling such that deformation 138 in top portion 118 of fastener 114 is reduced or eliminated when installed in structure 104.

With the use of fastener installation system 102 to cool and install fastener 114 in structure 104, deformation 138 of top portion 118 of fastener 114 with dielectric material 122 may be reduced or eliminated. As a result, more efficient and structurally sound fastener systems may be installed in structure 104.

Further, fastener 114 may be installed in structure 104 such that dielectric material 122 of top portion 118 of fastener 114 lies within selected tolerances 135 of surface 133 of structure 104 to create a smooth surface on the exterior of structure 104. As a result, the aerodynamic performance of structure 104 in aircraft 108 may be increased, while still providing a desired level of electromagnetic effect protection 126 from events 125 that may be encountered by structure 104 in aircraft 108.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for installing a fastener, the method comprising:

positioning a cap around the fastener;

spraying a cooling agent from a sprayer of a cooling system to stiffen a top portion of the fastener by cooling the top portion of the fastener to a temperature such that the top portion of the fastener has a desired level of stiffness; and installing the fastener in a structure while retaining the cooling agent within the cap.

2. The method of claim 1, wherein the top portion of the fastener includes a dielectric material.

3. The method of claim 2, wherein the dielectric material is selected from at least one of a polymer, a thermoplastic material, a thermoset material, an adhesive, or rubber.

4. The method of claim 2, wherein the fastener is installed after cooling such that deformation in the top portion of the fastener is reduced when installed in the structure.

5. The method of claim 2, wherein the dielectric material is placed on top of a head of the fastener and is configured to provide electromagnetic effect protection.

6. The method of claim 1, wherein cooling the fastener comprises:

cooling a dielectric material associated with a head of the fastener to a temperature of less than about −78° C. such that the dielectric material has the desired level of stiffness.

7. The method of claim 1, wherein installing the fastener further comprises:

installing the fastener using a rivet gun.

8. The method of claim 7, wherein the rivet gun is associated with a robotic device.

9. The method of claim 8 further comprising:

positioning the fastener within the cap of the cooling system associated with the robotic device and configured to cool the fastener prior to installing the fastener using the robotic device.

10. The method of claim 1, wherein the fastener is installed in an aircraft.

11. The method of claim 1, wherein stiffening the top portion of the fastener comprises:

cooling the top portion of the fastener using the cooling system comprising at least one of dry ice, liquid nitrogen, a refrigerant, a cooler, a refrigeration unit, or cooled air.

12. The method of claim 1, wherein the fastener is selected from one of a bolt, a screw, a hexdrive, an interference fit fastener, a rivet, a lockbolt, and a tapered sleeved bolt.

13. A method for installing a fastener, the method comprising:

positioning the fastener within a cap for cooling system associated with a robotic device and configured to cool the fastener prior to installing the fastener using the robotic device, in which the fastener is selected from one of a bolt, a screw, a hexdrive, an interference fit fastener, a rivet, a lockbolt, and a tapered sleeved bolt;

cooling a top portion of the fastener by spraying a cooling agent from a sprayer associated with the robotic device, in which the top portion of the fastener includes a dielectric material selected from at least one of a polymer, a thermoplastic material, a thermoset material, an adhesive, or rubber and configured to provide electromagnetic effect protection, and in which the fastener is cooled to a temperature such that the top portion of the fastener has a desired level of stiffness; and while retaining the cooling agent within the cap, installing the fastener in a structure using a rivet gun associated with the robotic device after cooling such that deformation in the top portion of the fastener is reduced when installed in the structure in an aircraft.

* * * * *